April 11, 1944. W. B. SHANLEY 2,346,401
TREATING HYDROCARBONS
Filed June 30, 1941
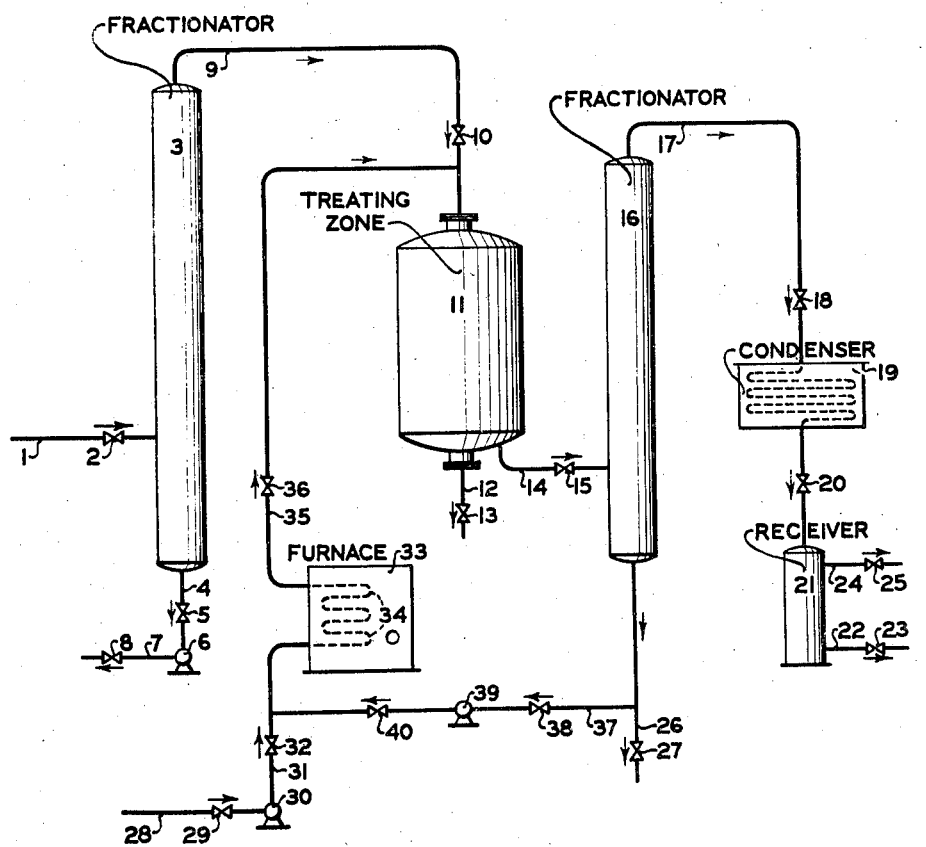
INVENTOR
WILLIAM B. SHANLEY
BY *Lee J. Gary*
ATTORNEY Patented Apr. 11, 1944

2,346,401

UNITED STATES PATENT OFFICE 2,346,401

TREATING HYDROCARBONS

William B. Shanley, Chicago, Ill., assignor to Universal Oil Products Company, Chicago, Ill., a corporation of Delaware Application June 30, 1941, Serial No. 400,423

5 Claims. (Cl. 196—96)

This invention relates to a process for treating hydrocarbon distillate with adsorbent reagents of the earth type. More particularly, it relates to improvements in vapor phase clay treating processes wherein cracked vapors are subjected to treating conditions in the presence of fuller's earth and other similar treating agents.

In one specific embodiment the present invention comprises improvements in a process for vapor phase treating of cracked gasoline with adsorbent agents, both natural and synthetic, said improvements comprising increasing the temperature of the treatment as the activity of the clay decreases by introducing heated hydrocarbon distillate boiling above the gasoline range and mixing it with the gasoline-containing vapors prior to introduction to the treating zone.

In the present invention any well-known treating earth may be employed. These include fuller's earth, Florida earth, floridan, and various other adsorptive earths and minerals, for example, montmorillonite or bentonitic clays. These clays may or may not be activated by treatment with acids or other chemicals. Suitable synthetic agents may be produced by the separate or simultaneous precipitation of silica and refractory oxides such as alumina, followed by washing, drying, and calcining. The various adsorptive agents are not exactly equivalent in their action.

The invention is further understood by reference to the accompanying drawing which is diagrammatic and should not be construed as limiting the process to the exact features shown.

Referring to the drawing, hydrocarbon vapors such as the vapors from the flash chamber of a cracking plant are introduced through line 1 containing valve 2 to fractionator 3. High boiling oil is removed through line 4 containing valve 5 by pump 6 and passed through line 7 and valve 8 to the cracking plant for further conversion. Vapors containing gasoline and gas are removed through line 9 containing valve 10 to treating zone 11 which contains a treating agent of the type previously indicated. The tower contains a polymer draw-off and drain line 12 containing valve 13. The temperature at which the vapors are introduced to zone 11 depends to a certain extent upon the end point of the overhead product and upon the conditions of temperature and pressure under which the fractionator is operated. Normally the temperature is about 375–400° F. although this may vary in either direction. The fractionator operates at a pressure of about 50 to about 150 pounds per square inch more or less and the pressure may be reduced at valve 10 to that employed in the treating zone. The usual vapor phase clay treating operation is at about 50 pounds per square inch pressure, more or less, and is preferably at about 20–40 pounds. All of these features are conventional and well known means of operating vapor phase clay treating processes. The treated vapors pass through line 14 containing valve 15 to the after-fractionator 16, from which an end point gasoline is removed through line 17 containing valve 18, condenser 19, and valve 20. The gasoline is collected in receiver 21 and is removed through line 22 containing valve 23 to subsequent treating steps not shown. This may include steps for removing hydrogen sulfide, sweetening the gasoline, and the addition of gum inhibitors to improve the storage stability. Gaseous products are removed through line 24 containing valve 25 to a gas recovery system not shown. The polymer and material boiling above the gasoline range is removed from fractionator 16 through line 26 containing valve 27 and may be used for fuel or may be returned to the cracking plant for further conversion. Up to this point the operation described is purely conventional.

I have found that improved results are obtained by adding a higher boiling fraction of hydrocarbon oil to the treating zone in the following manner:

Gas oil, kerosene, or high boiling naphtha, which boils substantially above the gasoline range and from which gasoline is readily separated by fractionation, may be introduced through line 28, containing valve 29, by means of pump 30, through line 31, containing valve 32, to coil 33, which is disposed in heater 34. The temperature to which the distillate is heated is dependent upon the treating conditions desired in zone 11 and is gradually increased as the activity of the agent in the treating zone diminishes. In the orthodox method no temperature control is possible since the treating temperature depends entirely on the endpoint of the charge to the tower. The temperature of the oil is above that of the vapors being supplied to zone 11 and the intention is gradually to increase the temperature in the treating zone as the cumulative volume of gasoline processed, increases. This may be done by gradually raising the temperature of the gas oil, maintaining the volume constant.

Preferably, however, I maintain the temperature of the oil constant and increase the volume added to the treating zone. As a further alternative, a side cut from a crude oil fractionator (not shown) may be passed to the treating zone without intermediate heating or cooling, the temperature increase in zone 11 being accomplished by increasing the volume of hot gas oil supplied to the treating zone.

The expedient of increasing the volume of hot gas oil is particularly advantageous because of the solvent effect which the oil has. As the activity of the clay decreases there is a tendency for the gum forming constitutents in the treated gasoline to increase and it has been found that the addition of gas oil tends to overcome this tendency. Thus it is seen that the effectiveness of the process is not merely a function of the temperature increase but that the added heavier oil plays an important part of its own. Whether this effect is because the gas oil tends to retain gum forming bodies which would otherwise remain in the gasoline, or whether it exerts a solvent effect on the heavy polymers which deposit on the treating agent, or whether there is a combination of these effects cannot be stated with certainty and I have found, however, that a greater improvement is obtained in this way than is obtained when merely superheating the vapors passed to the treating zone. The temperature, however, should be maintained at a point below which substantial cracking occurs. Usually the temperature does not substantially exceed 550° F. and is preferably of the order of 400–475° F.

The heated oil passes through line 35 containing valve 36 and is introduced into treating zone 11. It may or may not be mixed with the incoming gasoline vapors but it is preferred to mix these two streams prior to introduction into zone 11. The oil then passes through the clay in the manner previously described.

By treatment according to this invention, the yield of treated gasoline obtainable per ton of treating earth is materially increased.

In one operation wherein West Texas gas oil is processed the increased yield may amount to about 1500–2000 barrels per ton or even more. Moreover, there is a substantial decrease in the amount of sulfur contained in the treated gasoline when operating in this manner.

The bottoms from fractionator 16 may be used as fuel oil or may be passed to a cracking operation. This gas oil is particularly suitable for use as a catalytic cracking stock.

As stated before, it is not understood exactly why the benefit is obtained. One reason is that the temperature can be controlled and since the clay which has been used until the activity drops requires somewhat higher operating temperatures to be effective this can be accomplished by the principle of this invention. Moreover, the higher boiling added oil remains, to a large extent, in liquid phase while passing through the treating zone and as a result, the high boiling polymers formed from the cracked gasoline vapors are dissolved in the liquid oil and removed from the system. It should be understood, however, that I do not bind myself to any such explanation in view of the complexity of the treating reaction.

As an alternative to the above operation, a portion of the bottom from fractionator 16 may be passed through line 37, valve 38, pump 39, and valve 40, to line 31 and thence recycled through coil 33 to treating zone 11.

I claim as my invention:

1. A method for refining gasoline-containing vapors which comprises continuously passing a stream of the vapors through a bed of adsorbent refining agent, and, as the activity of said agent decreases, increasing the temperature of the refining treatment by adding to the vapor stream being passed through said bed a hydrocarbon oil heavier than gasoline heated to higher temperature than the gasoline-containing vapors.

2. A method for refining gasoline-containing vapors which comprises adding to the vapors a hotter hydrocarbon oil heavier than gasoline, passing the resultant mixture through a bed of adsorbent refining agent, and, as the activity of said agent decreases, increasing the amount of said hotter oil being added to the vapors, whereby to increase the temperature of the refining treatment.

3. A method for refining gasoline-containing vapors which comprises adding to the vapors a hotter hydrocarbon oil heavier than gasoline, passing the resultant mixture through a bed of adsorbent refining agent, and, as the activity of said agent decreases, increasing the temperature of said hotter oil being added to the vapors, whereby to increase the temperature of the refining treatment.

4. The process is defined in claim 1 further characterized in that the heavier oil being added to the vapor stream is of substantially constant temperature and the amount thereof gradually increased with diminishing activity of the refining agent.

5. The process as defined in claim 1 further characterized in that the heavier oil is added to the vapor stream and the temperature thereof gradually increased as the activity of the refining agent decreases.

WILLIAM B. SHANLEY.